(12) United States Patent
Uguen

(10) Patent No.: US 7,023,715 B2
(45) Date of Patent: Apr. 4, 2006

(54) VOLTAGE CONVERTER USING MOS TRANSISTOR

(75) Inventor: Emeric Uguen, La Fresnaye Au Sauvage (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 2 days.

(21) Appl. No.: 10/509,780

(22) PCT Filed: Mar. 20, 2003

(86) PCT No.: PCT/IB03/01026

§ 371 (c)(1),
(2), (4) Date: Sep. 29, 2004

(87) PCT Pub. No.: WO03/084039

PCT Pub. Date: Oct. 9, 2003

(65) Prior Publication Data
US 2005/0174814 A1 Aug. 11, 2005

(30) Foreign Application Priority Data
Mar. 29, 2002 (FR) .................................. 02 04013

(51) Int. Cl.
*H02M 3/07* (2006.01)
(52) U.S. Cl. ...................................................... 363/60
(58) Field of Classification Search ............. 363/59, 363/60; 327/536, 537; 307/110
See application file for complete search history.

(56) References Cited

U.S. PATENT DOCUMENTS

| | | | | |
|---|---|---|---|---|
| 6,084,789 | A * | 7/2000 | Van Lieshout ................ | 363/60 |
| 6,538,907 | B1 * | 3/2003 | Hoshino et al. .............. | 363/60 |
| 6,650,555 | B1 * | 11/2003 | Suzuki et al. ................. | 363/60 |
| 6,717,829 | B1 * | 4/2004 | Appeltans ..................... | 363/59 |
| 6,738,272 | B1 * | 5/2004 | Yamanaka et al. ............ | 363/60 |
| 6,885,568 | B1 * | 4/2005 | Kernahan et al. ............. | 363/97 |

* cited by examiner

*Primary Examiner*—Adolf Berhane
(74) *Attorney, Agent, or Firm*—Adam L. Stroud

(57) ABSTRACT

The invention relates to a voltage converter for generating an output voltage at an output terminal from an input voltage VDD taken from ground GND, said voltage converter comprising a switched capacitance Cp arranged in a bridge of transistors of the MOS type functioning as switches, each transistor being controlled by a control signal having a level varying in the rhythm of a clock signal clock. The invention is characterized in that the converter comprises at least a control circuit for supplying said control signal applied between the gate and the source of one of the transistors functioning as a switch, said control circuit having the particular function of generating a control signal having an amplitude which is inversely proportional to the input voltage VDD when the transistor which it controls is equivalent to a closed switch.

5 Claims, 5 Drawing Sheets

VOLTAGE CONVERTER USING MOS TRANSISTOR

FIELD OF THE INVENTION

The invention relates to a voltage converter for generating an output voltage at an output terminal from an input voltage VDD taken from ground GND, said voltage converter comprising:
- a capacitance Cp having a first terminal N1 and a second terminal N2,
- four transistors T1-T2-T3-T4 of the MOS type functioning as switches, each transistor being controlled by a control signal having a level varying in the rhythm of a clock signal, each transistor comprising a source, a gate, a drain, and such that the first transistor T1 is connected between the input voltage VDD and the first terminal N1, the second transistor T2 is connected between the first terminal N1 and ground GND, the third transistor T3 is connected between the input voltage VDD and the second terminal N2, and the fourth transistor T4 is connected between the second terminal N2 and the output terminal.

The invention finds numerous applications in electronic apparatus with voltage converters using MOS-type transistors.

BACKGROUND OF THE INVENTION

Numerous electronic equipment having only one input voltage of a low level use a voltage converter with which an output voltage of a higher amplitude can be generated. Particularly, voltage doublers are currently used for multiplying the amplitude of the input voltage by two.

FIG. 1 shows a prior-art voltage converter referred to as "switched capacity" converter. This is a voltage doubler.

This voltage converter uses four transistors T1-T2-T3-T4 functioning as switches, as well as a capacitance Cp. The transistors T2 and T3 are closed at the high levels of the clock signal CLK, while the transistors T1 and T4 are closed at the low levels of the clock signal CLK via the inverter INV.

When T2 and T3 are equivalent to closed switches, the capacitance Cp is charged until it has a potential difference $U_{cp}$=VDD at its terminals. When T1 and T4 are, in their turn, equivalent to closed switches, the terminal N1 is connected to the input voltage VDD which, taking the charge state of the capacitance Cp into account, brings the output terminal Vout to the potential 2*VDD.

The capacitance Cr does not have an important role for the function of the converter but allows a reduction of the ripple of the output voltage.

This type of voltage converter has a certain number of limitations when the level of the input voltage varies from one electronic apparatus to another.

At different switching instants of the switches T2–T3 and T1–T4, the capacitance Cp is charged with a time constant which is defined by the resistances of the drain-source junctions of the transistors T2–T3 and T1–T4. The peaks of the switching current Ic at different switching instants are therefore proportional to the input voltage VDD and inversely proportional to the resistance of the drain-source $R_{MOS}$ of the transistors T2–T3 and T1–T4. The switching current Ic thus has the form of:

$$Ic = K1.VDD/R_{MOS} \text{ with } K1 = \text{constant} \qquad \text{Eq. 1}$$

Moreover, when they are equivalent to closed switches, the resistance $R_{MOS}$ of the transistors T1-T2-T3-T4 of the MOS type is inversely proportional to their gate-source voltage, i.e. inversely proportional to the input voltage VDD when they are equivalent to closed switches when a potential difference $V_{GS0}$ of the amplitude VDD is applied between their gate and their source via the signal CLK. The resistance $R_{MOS}$ of each transistor T1-T2-T3-T4 is thus in the form of:

$$R_{MOS} = K2/V_{GS0} \text{ with } K2 = \text{constant} \qquad \text{Eq. 2}$$

$$R_{MOS} = K2/VDD$$

While taking Eq. 1 into account, the switching current Ic increases in a quadratic manner as a function of the input voltage VDD. Consequently, it has the form of:

$$Ic = K3.VDD^2 \text{ with } K3 = \text{constant} \qquad \text{Eq. 3}$$

These switching current peaks generate parasitic noise which is stronger as the amplitude of the peaks is higher. Particularly if the input voltage VDD increases from electronic equipment to electronic equipment, the parasitic noise also increases. Taking into account that the current Ic increases in a quadratic manner as a function of the input voltage VDD, a small variation of the input voltage VDD involves a considerable variation of the switching current and thus of the parasitic noise.

With such a voltage converter, the noise level can therefore not be guaranteed at a constant level when the input voltage VDD varies, even if VDD varies only very slightly. This technical limitation of such a prior-art converter is particularly annoying for satisfying the requirements of electromagnetic compatibility standards.

OBJECT AND SUMMARY OF THE INVENTION

It is an object of the invention to provide a voltage converter with which the variations of the switching current can be reduced.

To this end, the voltage converter is characterized in that it comprises at least a control circuit for supplying said control signal applied between the gate and the source of one of the transistors T1-T2-T3 functioning as a switch, said control circuit having the particular function of generating a control signal having an amplitude which is inversely proportional to the input voltage VDD when the transistor which it controls is equivalent to a closed switch.

The control signal $V_{GS}$ generated by the control circuit according to the invention has the form of:

$$V_{GS} = K4/VDD \text{ with } K2 = \text{constant} \qquad \text{Eq. 4}$$

The resistance $R_{MOS}$ of the transistor controlled by the control circuit has the form of:

$$R_{MOS} = K2/V_{GS} \text{ with } K2 = \text{constant} \qquad \text{Eq. 5}$$

Taking Eq. 4 and Eq. 5 into account, the resistance $R_{MOS}$ will be proportional to the input voltage VDD. The resistance $R_{MOS}$ has the form of:

$$R_{MOS} = K5.VDD \text{ with } K5 = \text{constant} \qquad \text{Eq. 6}$$

Taking Eq. 1 and Eq. 6 into account, the switching current Ic will be invariant at the variations of the input voltage VDD. The switching current thus has the form of:

$$Ic = K6 \text{ with } K6 = \text{constant} \qquad \text{Eq. 7}$$

The variations of the peaks of the switching current Ic at different switching instants of the transistors T2–T3 and T1–T4 are thus canceled by generating a control signal having an amplitude which is inversely proportional to the input voltage VDD. The peaks of the switching current Ic are thus invariant with respect to the variations of the input voltage VDD, which guarantees a constant noise level when the input voltage VDD varies.

The invention is also characterized in that said control circuit comprises, when it controls a transistor of the P-MOS type:

an additional transistor M1 of the P-MOS type functioning as a closed switch, a current source IREF_1 arranged in series with the drain-source junction of said additional transistor M1, a switch COM1 having two inputs, the first input E1 of which is connected to the central tap P of the additional transistor M1 and the current source IREF_1, and the second input E2 is connected to the input voltage VDD, said switch being controlled via said clock signal.

This association of means provides the possibility of generating, at low cost, a control signal having an amplitude which is inversely proportional to the input voltage VDD.

An additional advantage of this particular embodiment is the very good compensation of the variations of the resistance $R_{MOS}$ of the additional transistor and the transistor controlled by the control circuit in so far as these transistors may be identical.

The invention is also characterized in that said control circuit comprises, when it controls a transistor of the N-MOS type:

an additional transistor M2 of the N-MOS type functioning as a closed switch, a current source IREF_2 arranged in series with the drain-source junction of said additional transistor M2, a switch COM2 having two inputs, the first input E1 of which is connected to the central tap P of the additional transistor M2 and the current source IREF_2, and the second input E2 is connected to ground GND, said switch being controlled via said clock signal.

This association of means provides the possibility of generating, at low cost, a control signal having an amplitude which is inversely proportional to the input voltage VDD.

An additional advantage of this particular embodiment is the very good compensation of the variations of the resistance $R_{MOS}$ of the additional transistor and the transistor controlled by the control circuit in so far as these transistors may be identical.

The invention also relates to an integrated circuit, comprising a voltage converter according to the invention.

The invention also relates to a device for reading smart cards comprising a voltage converter according to the invention for generating an output voltage having a higher amplitude from an input voltage. This output voltage is intended to serve as input voltage for a voltage regulator supplying a set of output voltages for feeding a smart card, and thus provides the possibility of exchanging data between the reading device and the smart card.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF EMBODIMENTS

Figure 1:
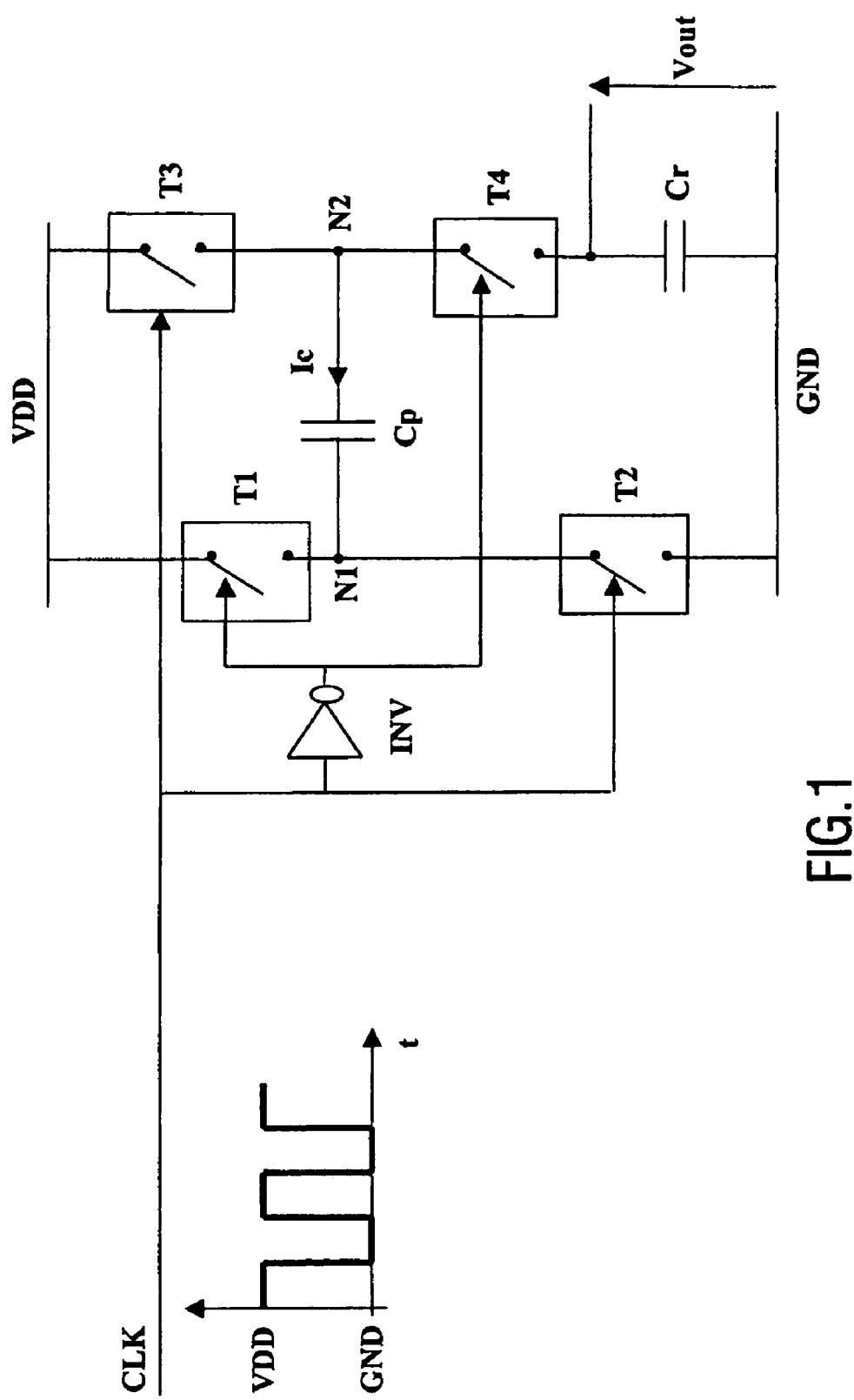
FIG. 1 shows a voltage converter of the prior art.
Figure 2:
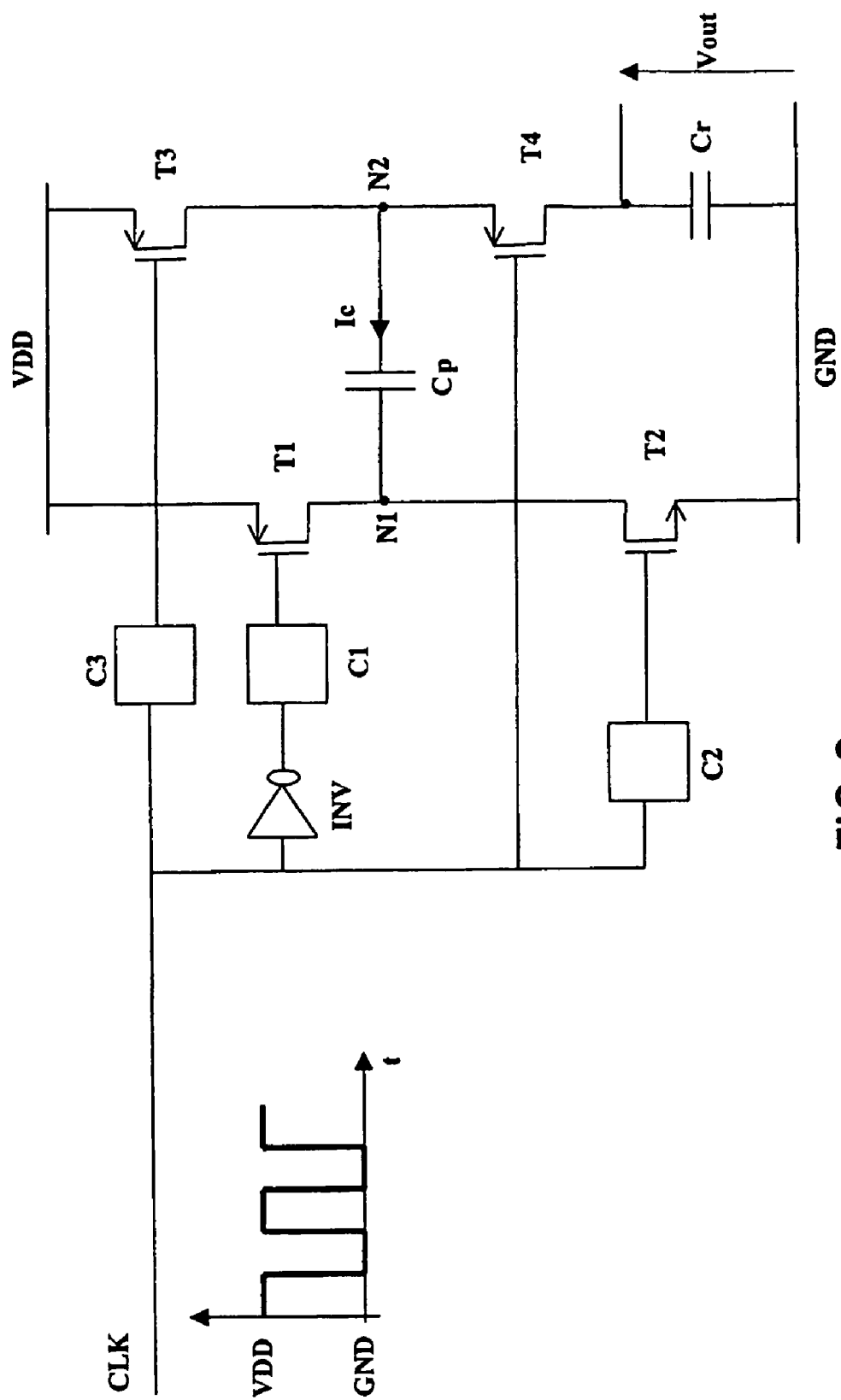
FIG. 2 shows a voltage converter according to the invention.

FIG. 2 shows a voltage converter according to the invention. This converter is based on the same operating principle as the prior-art voltage converter described with reference to FIG. 1.

To this end, the converter shown in FIG. 2 uses transistors T1-T2-T3-T4 of the MOS type functioning as switches. The transistors T1-T3-T4 are of the P-MOS type while the transistor T2 is of the N-MOS type.

When the transistors T2–T3 are equivalent to closed switches, the transistors T1–T4 are equivalent to open switches. Inversely, when the transistors T2–T3 are equivalent to open switches, the transistors T1–T4 are equivalent to closed switches. The change of state of the transistors T1-T2-T3-T4 functioning as switches is effected in the rhythm of the clock signal CLK.

The switching cycle of the transistors T1-T2-T3-T4 allows charging of the capacitance Cp when the transistors T2–T3 are equivalent to closed switches so as to supply an output voltage Vout having a level which is higher than the input voltage VDD when the transistors T1–T4 are equivalent to closed switches.

The transistors T1-T2-T3 are controlled by control circuits according to the invention so as to allow a change of state of the transistors T1-T2-T3 functioning as switches by generating a control signal applied between the gate and the source of each transistor controlled in this way.

The control circuits C1 and C3 are identical because they control both transistors of the P-MOS type. The control circuit C1 controlling the transistor T1 supplies a control signal which varies in the rhythm of the inverse value of the clock signal CLK via the inverter INV, while the control circuit C3 supplies a control signal which varies in the rhythm of the clock signal CLK. The control circuit C2 dedicated to the control of a transistor of the N-MOS type supplies a control signal which varies in the rhythm of the clock signal CLK.

Each control circuit is characterized in that it supplies a control signal having an amplitude which is inversely proportional to the input voltage VDD when the transistor which it controls is equivalent to a closed switch. This has the result that the resistance $R_{MOS}$ of each transistor controlled by the control circuit becomes proportional to the input voltage VDD. Consequently, the switching current Ic becomes invariant to the variations of the input voltage VDD.

Each control circuit thus provides the possibility of supplying said control signal at such a potential level that it enables the transistor which it controls to function as an open switch. To this end, the control signal has the level of the input voltage VDD if the controlled transistor is of the P-MOS type and has the level of ground GND if the controlled transistor is of the N-MOS type.

The capacitance Cr does not play a major role as regards the operating principle of the converter, but it allows a reduction of the ripple of the output voltage Vout.

The transistor T4 of the P-MOS type is directly controlled at its gate by the clock signal CLK in such a way that it is equivalent to a closed or an open switch at the same time as the transistor T1.

Although FIG. 2 shows a converter using a control circuit for each transistor T1, T2 and T3, the invention also provides a voltage converter (not shown) in which only one or two of the transistors T1, T2 and T3 are controlled by a control circuit. This converter provides the possibility of obtaining a converter at lower cost because the number of control circuits is reduced.

Figure 3:
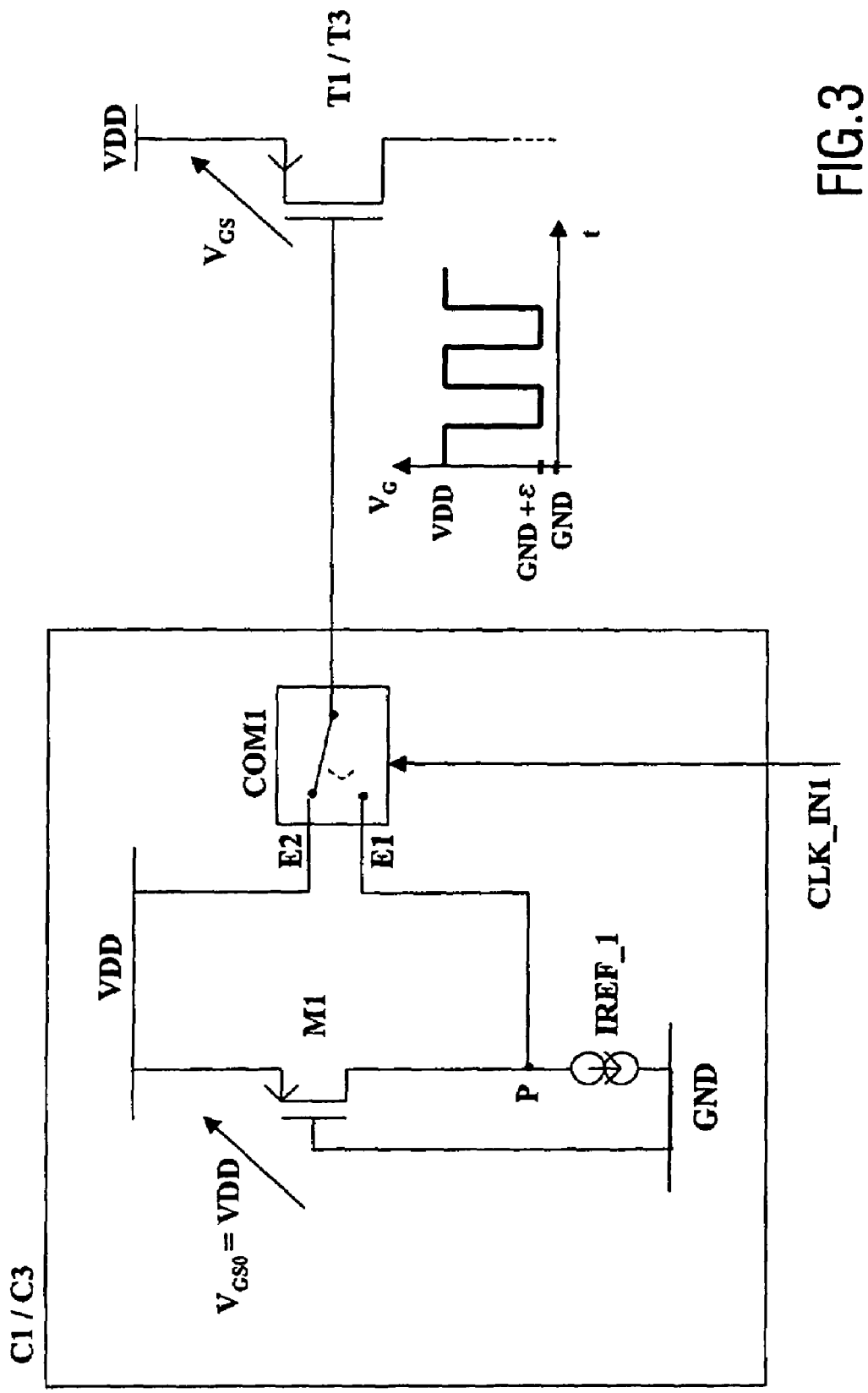
FIG. 3 is a first control circuit for controlling transistors of the P-MOS type in a voltage converter according to the invention.

FIG. 3 is a first control circuit for controlling transistors of the P-MOS type in a voltage converter according to the invention.

Such a control circuit C1 is used for controlling the transistor T1 of the P-MOS type, and such a control circuit C3 is used for controlling the transistor T3 of the P-MOS type.

Each control circuit comprises an additional transistor M1 of the P-MOS type functioning as a closed switch. To this end, the gate of the transistor M1 is connected to ground GND so that a potential difference $V_{GS0}$=VDD is applied between the gate and the source of M1.

The control circuit also comprises a current source IREF_1 arranged in series with the drain-source junction of said digital transistor M1. This current source supplies a current IREF_1 in the drain-source junction of said additional transistor M1. The value of the current IREF_1 is constant and is particularly independent of the input voltage VDD.

The control circuit also comprises a switch COM1 having two inputs E1 and E2, the first input E1 being connected to the central tap of the additional transistor and the current source, the second input E2 being connected to the input voltage VDD.

The switch COM1 is controlled by the clock signal CLK_IN1. For the control circuit C1, the clock signal CLK_IN1 corresponds to the clock signal supplied at the output of the inverter INV of FIG. 2. For the control circuit C3, the clock signal CLK_IN1 corresponds to the clock signal CLK of FIG. 2.

When the clock signal CLK_IN1 is at the low level, i.e. at ground GND, a potential VDD is applied to the gate of transistor T1/T3. The control circuit thus applies a potential difference $V_{GS}$=0 between the gate and the source of the transistor T1/T3. Consequently, the transistor T1/T3 is equivalent to an open switch.

When the clock signal CLK_IN1 is at the high level, i.e. at the input voltage VDD, a potential $V_{GS}$ which is equal to that at the central tap P between the current source IREF_1 and the drain-source junction of M1 is applied to the gate of the transistor T1/T3. The control circuit thus applies a potential difference $V_{GS}$ between the gate and the source of the transistor T1/T3, which is equal to the potential difference at the terminals of the drain-source junction of the transistor M1, which potential difference is inversely proportional to the input voltage VDD. Since the potential at the tap P has a small value, the potential difference $V_{GS}$ has a value which is sufficiently high to render the transistor T1/T3 equivalent to a closed switch.

In other words, when such a control circuit controls a transistor of the P-MOS type equivalent to a closed switch, it provides the possibility of applying a potential $V_G$ to the gate of the transistor T1/T3 which is slightly higher than ground GND by a quantity $\epsilon$ (of about several volts) so as to get rid of fluctuations of the input voltage VDD, in contrast to the prior-art converter in which a potential which is equal to GND would be applied to the gate of the transistor T1/T3.

In a particular embodiment, the inputs E1 and E2 of the switch COM1 of the switching circuit C1 are advantageously inverted in such a way that the clock signal CLK_IN1 corresponds to the clock signal CLK, thus economizing on the inverter INV.

Figure 4:
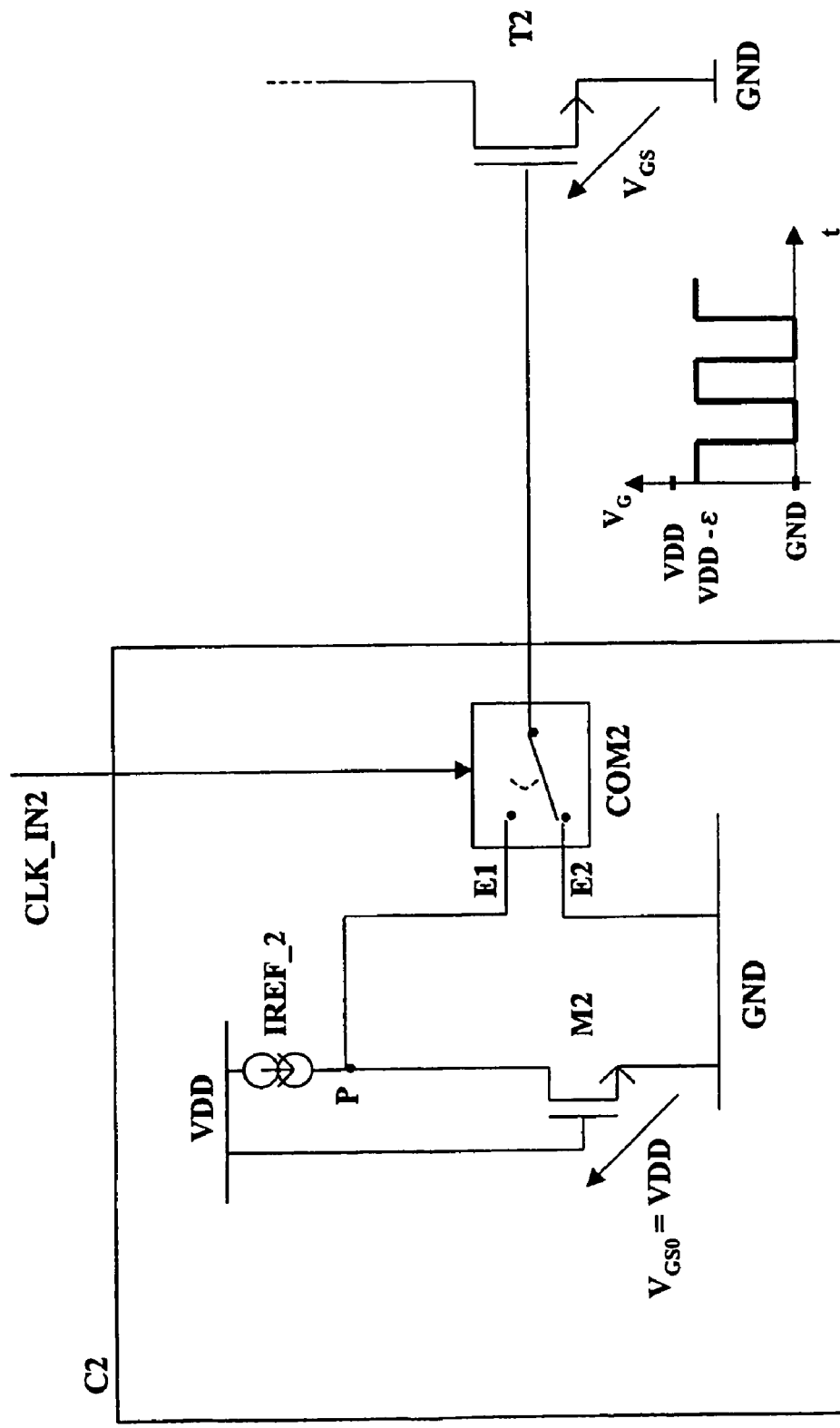
FIG. 4 is a second control circuit for controlling transistors of the N-MOS type in a voltage converter according to the invention.

FIG. 4 shows a second control circuit for controlling transistors of the N-MOS type in a converter according to the invention.

Such a control circuit C2 is used for controlling the transistor T2 of the N-MOS type.

The control circuit C2 comprises an additional transistor M2 of the N-MOS type functioning as a closed switch. To this end, the gate of the transistor M2 is connected to the input voltage VDD so as to apply a potential difference $V_{GS0}$=VDD between the gate and the source of M2.

The control circuit also comprises a current source IREF_2 arranged in series with the drain-source junction of said additional transistor M2. This current source supplies a current IREF_2 in the drain-source junction of said additional transistor M2. The value of the current IREF_2 is constant and is particularly independent of the input voltage VDD.

The control circuit also comprises a switch COM2 having two inputs E1 and E2, the first input E1 being connected to the central tap of the additional transistor and the current source, the second input E2 being connected to ground GND.

The switch COM2 is controlled by the clock signal CLK_IN2. The clock signal CLK_IN2 corresponds to the clock signal CLK of FIG. 2.

When the clock signal CLK_IN2 is at the low level, i.e. at ground GND, a potential GND is applied to the gate of transistor T2. The control circuit thus applies a potential difference $V_{GS}$=0 between the gate and the source of the transistor T2. Consequently, the transistor T2 is equivalent to an open switch.

When the clock signal CLK_IN2 is at the high level, i.e. at the input voltage VDD, a potential $V_G$ which is equal to that of the central tap P between the current source IREF_2 and the drain-source junction of M2 is applied to the gate of the transistor T2. The control circuit thus applies a potential difference $V_{GS}$ between the gate and the source of the transistor T2, which is equal to the potential difference at the terminals of the drain-source junction of the transistor M2, which potential difference is inversely proportional to the input voltage VDD. Since the potential difference between the input voltage VDD and the tap P has a small value, the potential difference $V_{GS}$ has a value which is sufficiently high to render the transistor T2 equivalent to a closed switch.

In other words, when such a control circuit controls a transistor of the N-MOS type equivalent to a closed switch, it provides the possibility of applying a potential $V_G$ to the gate of the transistor T2 which is slightly smaller than the input voltage VDD by a quantity $\epsilon$ (of about several volts) so as to get rid of fluctuations of the input voltage VDD, in contrast to the prior-art converter in which a potential which is equal to VDD would be applied to the gate of the transistor T2.

Figure 5:
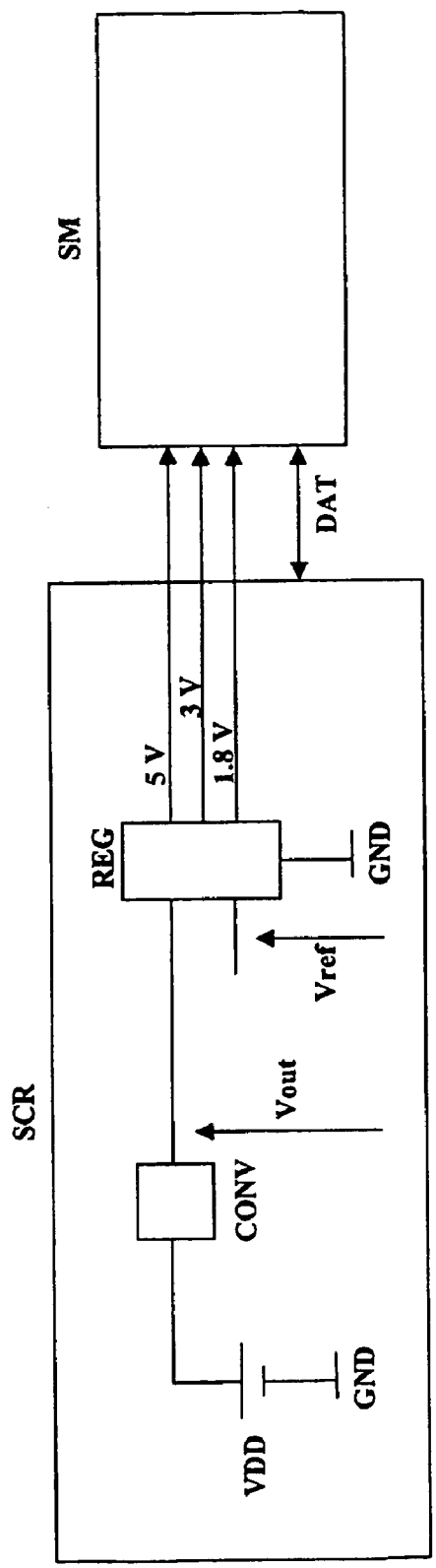
FIG. 5 shows a device for reading smart cards, comprising a voltage converter according to the invention.

FIG. 5 shows a device SCR for reading smart cards, comprising a voltage converter CONV according to the invention.

The device SCR comprises an input voltage source VDD connected to the input of a voltage converter according to the invention, as described with reference to FIG. 2. The converter CONV provides the possibility of supplying an output voltage Vout having a stronger amplitude than the input voltage VDD. Based on this output voltage Vout, a set of output voltages is generated by means of a voltage regulator REG, in which the regulation of these output voltages is effected on the basis of a reference voltage Vref within the reading device SCR. Particularly, these output voltages have a level of 5 volts, 3 volts and 1.8 volts and are intended to feed a smart card SM communicating with the device SCR for the purpose of exchanging data DAT.

The voltage converter according to the invention can be advantageously integrated in an integrated circuit, particularly an integrated circuit dedicated to the management of a device for reading smart cards.

The invention claimed is:

1. A voltage converter for generating an output voltage at an output terminal from an input voltage taken from ground, said voltage converter comprising:
   a capacitance having a first terminal and a second terminal,
   four transistors of the type functioning as switches, each transistor being controlled by a control signal having a level varying in the rhythm of a clock signal, each transistor comprising a source, a gate, a drain, and such that the first transistor is connected between the input voltage and the first terminal, the second transistor is connected between the first terminal and ground, the third transistor is connected between the input voltage and the second terminal, and the fourth transistor is connected between the second terminal and the output terminal,
   characterized in that it comprises at least a control circuit for supplying said control signal applied between the gate and the source of one of the transistors functioning as a switch, said control circuit having the particular function of generating a control signal having an amplitude which is inversely proportional to the input voltage when the transistor which it controls is equivalent to a closed switch.

2. A voltage converter as claimed in claim 1, characterized in that said control circuit comprises, when it controls a transistor of the P-MOS type:
   an additional transistor of the P-MOS type functioning as a closed switch,
   a current source arranged in series with the drain-source junction of said additional transistor,
   a switch having two inputs, the first input of which is connected to the central tap of the additional transistor and the current source, and the second input is connected to the input voltage, said switch being controlled via said clock signal.

3. A voltage converter as claimed in claim 1, characterized in that said control circuit comprises, when it controls a transistor of the N-MOS type:
   an additional transistor of the N-MOS type functioning as a closed switch,
   a current source arranged in series with the drain-source junction of said additional transistor,
   a switch having two inputs, the first input of which is connected to the central tap of the additional transistor and the current source, and the second input is connected to ground, said switch being controlled via said clock signal.

4. An integrated circuit comprising a voltage converter for generating an output voltage at an output terminal from an input voltage taken from ground, said voltage converter comprising:
   a capacitance having a first terminal and a second terminal,
   four transistors of the MOS type functioning as switches, each transistor being controlled by a control signal having a level varying in the rhythm of a clock signal, each transistor comprising a source, a gate, a drain, and such that the first transistor is connected between the input voltage and the first terminal, the second transistor is connected between the first terminal and ground, the third transistor is connected between the input voltage and the second terminal, and the fourth transistor is connected between the second terminal and the output terminal,
   characterized in that the voltage converter comprises at least a control circuit for supplying said control signal applied between the gate and the source of one of the transistors functioning as a switch, said control signal having the particular function of generating a control signal having an amplitude which is inversely proportional to the input voltage when the transistor which it controls is equivalent to a closed switch.

5. A device for reading smart cards, comprising a voltage converter for generating an output voltage at an output terminal from an input voltage taken from ground, said voltage converter comprising:
   a capacitance having a first terminal and a second terminal,
   four transistors of the MOS type functioning as switches, each transistor being controlled by a control signal having a level varying in the rhythm of a clock signal, each transistor comprising a source, a gate, a drain, and such that the first transistor is connected between the input voltage and the first terminal, the second transistor is connected between the first terminal and ground, the third transistor is connected between the input voltage and the second terminal, and the fourth transistor is connected between the second terminal and the output terminal,
   characterized in that the voltage converter comprises at least a control circuit for supplying said control signal applied between the gate and the source of one of the transistors functioning as a switch, said control signal having the particular function of generating a control signal with an amplitude which is inversely proportional to the input voltage when the transistor which it controls is equivalent to a closed switch.

* * * * *